US009391523B2

(12) United States Patent
Gaknoki et al.

(10) Patent No.: US 9,391,523 B2
(45) Date of Patent: *Jul. 12, 2016

(54) CONTROLLER WITH CONSTANT CURRENT LIMIT

(75) Inventors: Yury Gaknoki, San Jose, CA (US);
Mingming Mao, Saratoga, CA (US);
Michael Y. Zhang, Mountain View, CA (US)

(73) Assignee: Power Integrations, Inc., San Jose, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 13/243,818

(22) Filed: Sep. 23, 2011

(65) Prior Publication Data

US 2013/0077358 A1 Mar. 28, 2013

(51) Int. Cl.
*H02M 3/335* (2006.01)

(52) U.S. Cl.
CPC .................................. *H02M 3/33507* (2013.01)

(58) Field of Classification Search
CPC ... H02M 3/22; H02M 3/325; H02M 3/33507; H02M 3/335; H02M 3/33515; H02M 3/33523; H02M 3/3353; H02M 3/33538; H02M 3/33546; H02M 3/33553; H02M 3/33569; H02M 3/337; H02M 3/3376; H02M 3/338; H02M 3/3385; H02M 1/4258; H02M 2001/0006; H02M 2001/0009; H02M 2001/0025; H02M 2001/0029; H02M 2001/0032; G05F 3/26; G05F 3/262; G05F 3/265; G05F 3/267; G05F 3/24; G05F 3/242; G05F 3/245; G05F 3/247; G05F 3/205; G05F 3/22; G05F 3/222; G05F 3/225; G05F 3/227; Y02B 70/1475; H03K 5/08; H03K 5/082; H03K 5/084; H03K 5/086; H03K 5/088
USPC ......... 323/269–276, 280–288, 351, 311–317, 323/205–211, 222–226; 327/309, 530–541, 327/545; 330/255–261, 267, 268, 270–274, 330/285, 288, 290, 296, 535, 96, 127–142; 363/21.12–21.18, 19, 20, 20.01, 363/16–26, 40–43, 89, 95–98, 131–134
See application file for complete search history.

(56) References Cited

U.S. PATENT DOCUMENTS 5,394,112 A * 2/1995 Alini et al. .................... 330/256
5,745,352 A    4/1998 Sandri et al.
(Continued)

FOREIGN PATENT DOCUMENTS

CN    1405962 A    3/2003
CN    1987710 A    6/2007
(Continued)

OTHER PUBLICATIONS

Extended European Search Report received for European Patent Application No. 12185147.1, mailed on Mar. 7, 2014, 8 pages.
Office Action received for Chinese Patent Application No. 201210359640.2, issued on Feb. 28, 2014, 28 pages. (15 pages of English Translation and 13 pages of Official copy).
(Continued)

*Primary Examiner* — Timothy J Dole
*Assistant Examiner* — Carlos Rivera-Perez
(74) *Attorney, Agent, or Firm* — Blakely Sokoloff Taylor & Zafman LLP

(57) ABSTRACT

Methods and apparatuses are disclosed for generating a temperature independent current limit. The value of the temperature independent current limit may be determined based in part on an error signal representative of a difference between an actual output value and a desired output value of a power converter. When the error signal is below a lower threshold voltage, the temperature independent current limit may be set to a first value. When the error signal is above an upper threshold voltage, the temperature independent current limit may be set to a second, higher value. When the error signal is between the lower threshold voltage and the upper threshold voltage, the temperature independent current limit may change linearly with the error signal. The error signal may be adjusted to compensate for changes in the system caused by a change in temperature.

14 Claims, 7 Drawing Sheets

(56) References Cited

U.S. PATENT DOCUMENTS

| | | | |
|---|---|---|---|
| 6,087,820 A * | 7/2000 | Houghton et al. | 323/315 |
| 6,323,732 B1 * | 11/2001 | Angell et al. | 330/261 |
| 6,545,882 B2 * | 4/2003 | Yang | 363/21.08 |
| 6,871,289 B2 | 3/2005 | Pullen et al. | |
| 7,049,875 B2 * | 5/2006 | Tsividis | 327/308 |
| 7,170,352 B1 * | 1/2007 | Caldwell | 330/261 |
| 7,576,531 B2 * | 8/2009 | Nakabayashi | 323/285 |
| 7,733,074 B2 | 6/2010 | Hasegawa et al. | |
| 2003/0034765 A1 | 2/2003 | Yang | |
| 2004/0189375 A1 | 9/2004 | Lee et al. | |
| 2005/0083129 A1 * | 4/2005 | Tsurumaki et al. | 330/285 |
| 2009/0066304 A1 | 3/2009 | Nakabayashi | |
| 2009/0284994 A1 | 11/2009 | Lin et al. | |
| 2009/0304064 A1 | 12/2009 | Liu et al. | |
| 2011/0074352 A1 * | 3/2011 | Huynh et al. | 320/111 |
| 2012/0013400 A1 | 1/2012 | Chang et al. | |
| 2013/0077357 A1 | 3/2013 | Zhang et al. | |

FOREIGN PATENT DOCUMENTS

| | | |
|---|---|---|
| CN | 101299596 A | 11/2008 |
| EP | 1909382 A2 | 4/2008 |
| TW | 583820 B | 4/2004 |
| TW | 200822510 A | 5/2008 |
| WO | 99/08372 A1 | 2/1999 |

OTHER PUBLICATIONS

Office Action received for Korean Patent Application No. 10-2012-105437, mailed on Oct. 7, 2013, 13 pages (8 pages of English Translation and 5 pages of Official Copy).

Office Action Received for Korean Patent Application No. 10-2012-105437, mailed on Jun. 19, 2014, 6 pages (3 pages of English Translation and 3 pages of Official Copy).

Final Office Action received for U.S. Appl. No. 13/243,813, mailed on Jan. 30, 2014, 19 pages.

Non-Final Office Action received for U.S. Appl. No. 13/243,813, mailed on Aug. 1, 2013, 15 pages.

Non-Final Office Action received for U.S. Appl. No. 13/243,813, mailed on May 9, 2014, 18 pages.

Office Action received for Chinese Patent Application No. 201210359640.2, mailed on Oct. 10, 2014, 30 pages (16 pages of English Translation and 14 pages of Official Copy).

Office Action Received for Taiwan Patent Application No. 101134596, mailed on Sep. 4, 2014, 17 pages (8 pages of English Translation and 9 pages of Official Copy).

Final Office Action received for U.S. Appl. No. 13/243,813, mailed on Dec. 4, 2014, 20 pages.

Non-Final Office Action received for U.S. Appl. No. 13/243,813, mailed on Jun. 10, 2015, 20 pages.

* cited by examiner

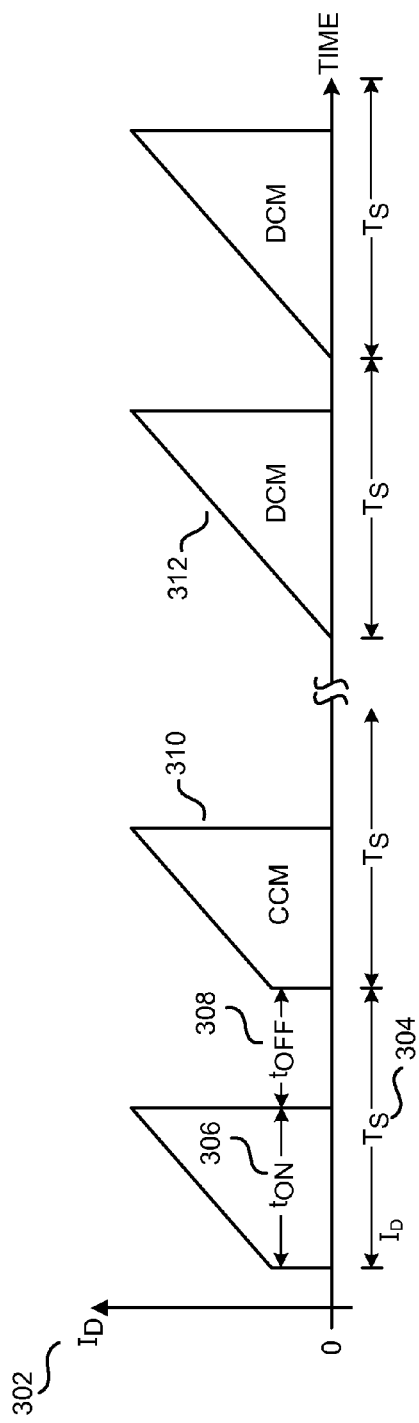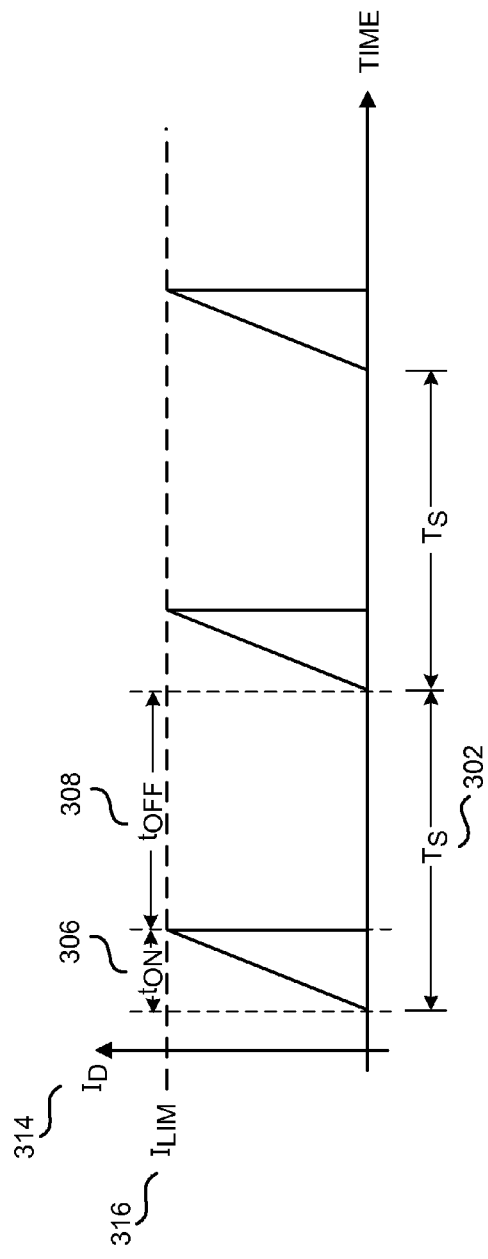
FIG. 3A
FIG. 3B

CONTROLLER WITH CONSTANT CURRENT LIMIT

CROSS-REFERENCE TO RELATED APPLICATIONS

This application is related to U.S. patent application Ser. No. 13/243,813, entitled "Adaptive Biasing for Integrated Circuits", filed herewith.

BACKGROUND

1. Field

The present disclosure relates generally to switched mode power converters and, more specifically, the present disclosure relates to switched mode power converters utilizing current mode control.

2. Related Art

Electronic devices use power to operate. Switched mode power converters are commonly used due to their high efficiency, small size, and low weight to power many of today's electronics. Conventional wall sockets provide a high voltage alternating current (ac) power. In a switched mode power converter, a high voltage ac input is converted to provide a regulated direct current (dc) output through an energy transfer element. In operation, a switch is utilized to provide the desired output by varying the duty ratio (typically the ratio of the on-time of the switch to the total switching period), varying the switching frequency, or varying the number of pulses per unit time of the switch in a power converter.

The switched mode power converter also includes a controller that typically provides output regulation by sensing and controlling the output in a closed loop. The controller may receive a feedback signal representative of the output and the vary one or more parameters (such as duty ratio, switching frequency, or the number of pulses per unit time of the switch) in response to the feedback signal to regulate the output to a desired quantity. Various modes of control may be utilized. One mode of control is known as pulse width modulation (PWM) peak current mode control. In PWM peak current mode control, the switch remains on until the current in the switch reaches a current limit. Once the current limit is reached, the controller turns the switch off for the remainder of the switching period. In general, a higher current limit results in a longer on-time of the switch and a larger duty ratio.

BRIEF DESCRIPTION OF THE DRAWINGS

The above and other aspects, features, and advantages of several embodiments of the present invention will be more apparent from the following more particular description thereof, presented in conjunction with the following drawings.

FIG. 3A is a diagram illustrating an example switching current waveform of a switching power converter operating in continuous conduction mode (CCM) and discontinuous conduction mode (DCM) in accordance with an embodiment of the present invention.

FIG. 3B is a diagram illustrating an example switching current waveform of a switching power converter utilizing pulse width modulation (PWM) current programmed control and operating in DCM in accordance with an embodiment of the present invention.

DETAILED DESCRIPTION

Figure 1:
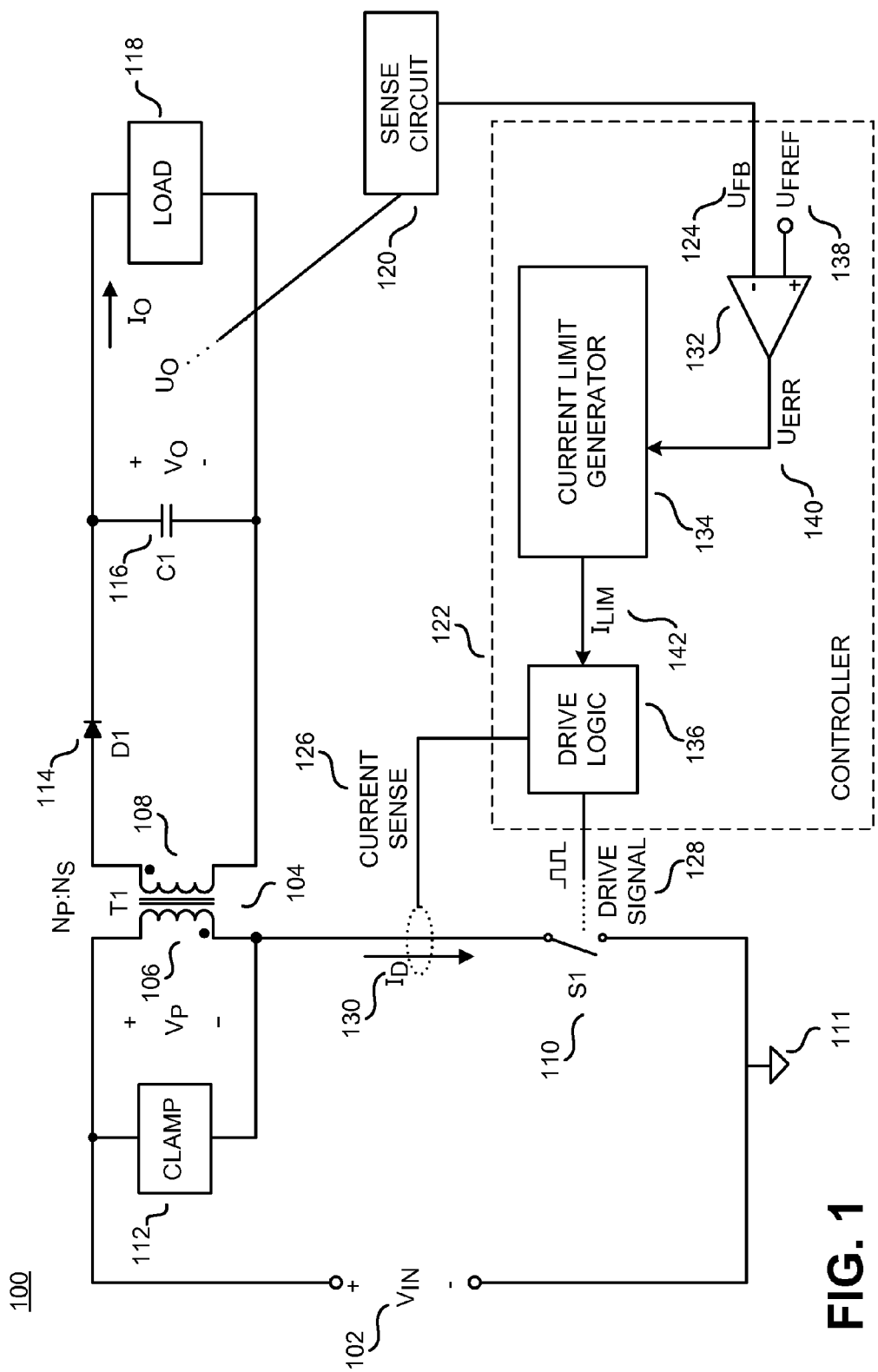
FIG. 1 shows an example power converter including a controller in accordance with an embodiment of the present invention.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example," or "an example" means that a particular feature, structure or characteristic described in connection with the embodiment or example is included in at least one embodiment of the present invention. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures, or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

A switched mode power converter includes a controller that typically provides output regulation by sensing and controlling the output in a closed loop. The controller may receive a feedback signal representative of the output and the controller may vary one or more parameters (such as duty ratio, switching frequency, or the number of pulses per unit time of the switch) in response to the feedback signal to regulate the output to a desired quantity. Various modes of control may be utilized. One mode of control is known as pulse width modulation (PWM) peak current mode control. In PWM peak current mode control, the switch remains on until the current in the switch reaches a current limit. Once the current limit is reached, the controller turns the switch off for the remainder of the switching period. In general, a higher current limit results in a longer on-time of the switch and a larger duty ratio. When the controller utilizes PWM peak current mode control, the accuracy of the current limit is important. However, as will be explained below, the accuracy of the current limit may be susceptible to variations in temperature.

Typically, the received feedback signal is compared to a reference signal to generate an error signal. In one example, the reference signal may represent the desired quantity which the output of the power converter is regulated to while the error signal is representative of the difference between the received feedback signal and the reference signal. The controller utilizes the error signal to determine the value of the current limit which will be utilized to control the switch and subsequently regulate the output. Previous solutions have utilized a resistor to convert the error signal to a current limit As a result, the current limit is also partially determined by the value of the resistor. However, the accuracy of the resistance of the resistor may vary depending on characteristics of the resistor and how the resistor was manufactured. For example, a temperature coefficient is associated with a resistor and generally relates the accuracy of the resistance with variations in temperature. A zero temperature coefficient resistor generally refers to a resistor which has a constant resistance with variations of temperature.

In addition, the controller sets minimum and maximum values for the current limit Previous solutions would set the minimum and maximum values by clamping the value of the error signal and then utilizing a resistor to convert the error signal to the minimum and maximum values of the current limit. Thus, the accuracy of the current limit is partially determined by the accuracy of the resistance. For previous solutions, a zero temperature coefficient resistor was utilized to provide an accurate current limit (including accurate minimum and maximum values) over different temperatures. However, zero temperature coefficient resistors (such as thin film resistors) are costly. Further, previous solutions would also design the error signal to be temperature independent to then provide a temperature independent current limit.

In embodiments of the present invention, a control loop is utilized to compensate for the changes in resistance by subsequently varying the value of the error signal. As such, the controller does not need to use a zero temperature coefficient resistor to convert the error signal to a current limit However, the control loop compensation breaks down at the minimum and maximum values of the current limit if the error signal is clamped to set the minimum and maximum values. Thus, in embodiments of the present invention, a temperature trimmed current reference is utilized to set the minimum and maximum values of the current limit rather than a clamp circuit to clamp the error voltage.

Referring first to FIG. 1, a schematic of an example power converter 100 is illustrated including input $V_{IN}$ 102, an energy transfer element T1 104 having a primary winding 106 and a secondary winding 108, a switch S1 110, a clamp circuit 112, a rectifier D1 114, an output capacitor C1 116, a load 118, an output quantity $U_O$, an output voltage $V_O$, an output current $I_O$, a sense circuit 120, a controller 122, a feedback signal $U_{FB}$ 124, a current sense input 126, a drive signal 128, and a switch current $I_D$ 130. Controller 122 further includes a feedback reference circuit 132, a current limit generator 134, a drive logic block 136, a feedback reference signal $U_{FREF}$ 138, an error signal $U_{ERR}$ 140, and a current limit $I_{LIM}$ 142. In the illustrated example, the power converter 100 is shown as a power converter having a flyback topology for explanation purposes. It is appreciated that other known topologies and configurations of power converter may also benefit from the teachings of the present disclosure.

The power converter 100 provides output power to the load 118 from an unregulated input voltage $V_{IN}$ 102. In one embodiment, the input voltage $V_{IN}$ 102 is a rectified and filtered ac line voltage. In another embodiment, the input voltage $V_{IN}$ 102 is an unregulated dc input voltage. The input voltage $V_{IN}$ 102 is coupled to the energy transfer element T1 104. In some embodiments, the energy transfer element T1 104 may include a coupled inductor. In other embodiments, the energy transfer element T1 104 may include a transformer. In the example of FIG. 1, the energy transfer element T1 104 includes two windings, a primary winding 106 and secondary winding 108. $N_P$ and $N_S$ represent the number of turns for the primary winding 106 and secondary winding 108, respectively. In the example of FIG. 1, primary winding 106 may be considered an input winding and secondary winding 108 may be considered an output winding. The primary winding 106 is further coupled to the active switch S1 110, which is then further coupled to the input return 111. In addition, the clamp circuit 112 is coupled across the primary winding 106 of the energy transfer element T1 104.

The secondary winding 108 of the energy transfer element T1 104 is coupled to the rectifier D1 114. In the example illustrated in FIG. 1, the rectifier D1 114 is exemplified as a diode and the secondary winding 108 is coupled to the anode end of the diode. However, in some embodiments, the rectifier D1 114 may be a transistor used as a synchronous rectifier. Both the output capacitor C1 116 and the load 118 are coupled to the rectifier D1 114. In the example of FIG. 1, the rectifier D1 114 is exemplified as a diode and both the output capacitor C1 116 and the load 118 are coupled to the cathode end of the diode. An output is provided to the load 118 and may be provided as either an output voltage $V_O$, output current $I_O$, or a combination thereof.

In addition, the switched mode power converter 100 further includes circuitry to regulate the output which is exemplified as output quantity $U_O$. In general, the output quantity $U_O$ is either an output voltage $V_O$, output current $I_O$, or a combination thereof. A sense circuit 120 is coupled to sense the output quantity $U_O$. In one embodiment, the sense circuit 120 may sense the output quantity using an additional winding on the energy transfer element T1 104. In another embodiment, the sense circuit 120 may sense the output quantity $U_O$ from the output of the power converter 100.

Controller 122 is further coupled to the sense circuit 120 and includes multiple terminals. At one terminal, the controller 122 receives a feedback signal $U_{FB}$ 124 from the sense circuit 120. The controller 122 further includes terminals for receiving the current sense input 126 and outputting the drive signal 128. The current sense input 126 provides information associated with the sensed switch current $I_D$ 130 in switch S1 110. In addition, the controller 122 provides a drive signal 128 to the switch S1 110 to control various switching parameters. Examples of such parameters may include switching frequency, switching period, duty cycle, or respective on and off times of the switch S1 110.

As illustrated in FIG. 1, the controller 122 includes the feedback reference circuit 132, current limit generator 134, drive logic block 136, feedback reference signal $U_{FREF}$ 138, error signal $U_{ERR}$ 140, and current limit $I_{LIM}$ 142. The feedback reference circuit 132 is coupled to receive the feedback signal $U_{FB}$ 124 from sense circuit 120. In one example, an amplifier may be utilized as the feedback reference circuit 132, which is sometimes also referred to as an error amplifier. In one example, feedback reference circuit 132 includes an integrator that integrates the difference between the reference signal $U_{FREF}$ 138 and the feedback signal $U_{FB}$ 124. In other examples, feedback reference circuit 132 may include a differentiator as well as an integrator to provide desired characteristics for the stability and the behavior of the power supply in response to changes in input voltage $V_{IN}$ 102 and output current $I_O$ as is well known in the art. The feedback reference circuit 132 also receives the feedback reference signal $U_{FREF}$ 138 and outputs the error signal $U_{ERR}$ 140. In this example, the error amplifier amplifies the difference between the feedback reference signal $U_{FREF}$ 138 and the feedback signal $U_{FB}$ 124. The output of the feedback reference circuit 132 is provided to the current limit generator 134 as error signal $U_{ERR}$ 140. The output of the current limit generator 134 (current limit $I_{LIM}$ 142) is coupled to and received by the drive logic block 136. Drive logic block 136 further receives current sense signal 126 and outputs drive signal 128.

In operation, the power converter 100 of FIG. 1 provides output power to the load 118 from an unregulated input $V_{IN}$ 102. The power converter 100 utilizes the energy transfer element T1 104 to transform the voltage from the input $V_{IN}$ 102 between the primary 106 and secondary 108 windings. The clamp circuit 112 is coupled to the primary winding 106 of the energy transfer element T1 104 to limit the maximum voltage on the switch S1 110. Switch S1 110 is opened and closed in response to the drive signal 128 received from the controller 122. It is generally understood that a switch that is closed may conduct current and is considered on, while a switch that is open cannot conduct current and is considered off. In the example of FIG. 1, switch S1 110 controls a current $I_D$ 130 in response to controller 122 to meet a specified performance of the power converter 100. In some embodiments, the switch S1 110 may be a transistor and the controller 122 may include integrated circuits and/or discrete electrical components. In one embodiment, controller 122 and switch S1 110 are included together in a single integrated circuit. In one example, the integrated circuit is a monolithic integrated circuit. In another example, the integrated circuit is a hybrid integrated circuit.

The operation of switch S1 110 also produces a time varying voltage $V_P$ between the ends of primary winding 106. By transformer action, a scaled replica of the voltage $V_P$ is produced between the ends of secondary winding 108, the scale factor being the ratio that is equal to the number of turns of secondary winding 108 divided by the number of turns of primary winding 106. The switching of switch S1 110 also produces a pulsating current at the rectifier D1 114. The current in rectifier D1 114 is filtered by output capacitor C1 116 to produce a substantially constant output voltage $V_O$, output current $I_O$, or a combination thereof at the load 118.

The sense circuit 120 senses the output quantity $U_O$ to provide the feedback signal $U_{FB}$ 124 to the controller 122. In the example of FIG. 1, the controller 122 also receives the current sense input 126 which relays the sensed switch current $I_D$ 130 in the switch S1 110. The switch current $I_D$ 130 may be sensed in a variety of ways, such as, for example, the voltage across a discrete resistor or the voltage across the transistor when the transistor is conducting.

The controller 122 outputs a drive signal 128 to operate the switch S1 110 in response to various system inputs to substantially regulate the output quantity $U_O$ to the desired value. With the use of the sense circuit 120 and the controller 122, the output of the switched mode power converter 100 is regulated in a closed loop.

As will be discussed in greater detail below, the current limit generator 134 converts the error signal $U_{ERR}$ 140 to a current limit $I_{LIM}$ 142. Along with controller 122, the current limit generator 134 provides an accurate current limit $I_{LIM}$ 142 over variations in temperature. While the current limit generator 134 provides an accurate current limit that is temperature independent, some components within the current limit generator 134 may be temperature dependent. The current limit generator 134 also provides an accurate current limit $I_{LIM}$ 142 over temperatures at the minimum and maximum values of the current limit $I_{LIM}$ 142. Current limit $I_{LIM}$ 142 is utilized by the drive logic 136 to control the operation of switch S1 110. In one example, the switch current $I_D$ 130 (provided by the current sense signal 126) is compared to the current limit $I_{LIM}$ 142. Once the switch current $I_D$ 130 reaches the current limit $I_{LIM}$ 142, drive logic 136 turns switch S1 110 off.

Figure 2:
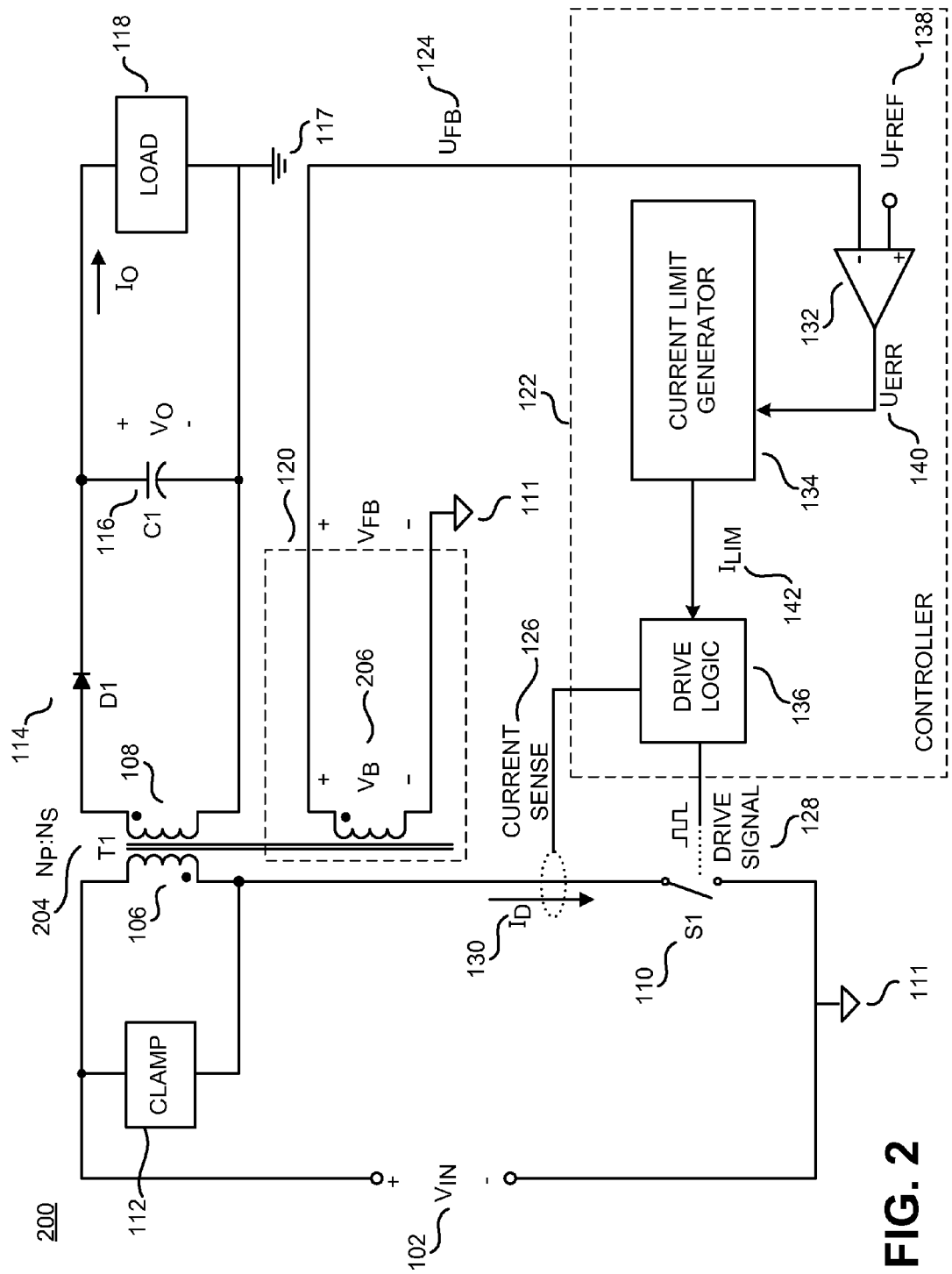
FIG. 2 is an example of a power converter including a controller that uses a winding on a coupled inductor to sense the output voltage in accordance with an embodiment of the present invention.

FIG. 2 illustrates an example of a power converter 200 that utilizes a winding on a coupled inductor to sense the output. The power converter 200 is illustrated including input $V_{IN}$ 102, an energy transfer element T1 204 having a primary winding 106 and a secondary winding 108, a switch S1 110, a clamp circuit 112, a rectifier D1 114, an output capacitor C1 116, a load 118, an output voltage $V_O$, an output current $I_O$, a sense circuit 120, a controller 122, a feedback signal $U_{FB}$ 124, a current sense input 126, a drive signal 128, and switch current $I_D$ 130. Controller 122 further includes a feedback reference circuit 132, a current limit generator 134, a drive logic block 136, a feedback reference signal $U_{FREF}$ 138, an error signal $U_{ERR}$ 140, and a current limit $I_{LIM}$ 142. The sense circuit 120 includes bias winding 206. As illustrated in FIG. 2, bias winding 206 is also a part of energy transfer element T1 204.

Power converter 200 is similar to the power converter 100, except that the sense circuit 120 utilizes a bias winding 206 on the energy transfer element T1 204 to sense the output voltage. Energy transfer element T1 204 may include a coupled inductor or a transformer. FIG. 2 includes the energy transfer element T1 204 which has a primary winding 106, a secondary winding 108, and a bias winding 206. The sense circuit 120 includes the bias winding 206. The sense circuit 120 may further include circuitry to provide the feedback signal $U_{FB}$ 124 (shown also as feedback voltage $V_{FB}$).

In operation, the bias winding 206 produces a voltage $V_B$ that is representative of the output voltage $V_O$ when rectifier D1 114 on secondary winding 108 conducts. During the on-time of the switch S1 110, the bias winding 206 produces a voltage $V_B$ that is representative of the input voltage $V_{IN}$ 102. In another example, bias winding 206 may also provide a source of power to the circuits within controller 122.

It is appreciated that many variations are possible in the use of a bias winding to sense an output voltage and for providing sensing while also providing power to a controller with galvanic isolation. For example, a bias winding may apply a rectifier and a capacitor similar to rectifier D1 114 and capacitor C1 116, respectively, to produce a dc bias voltage while providing an ac feedback signal from the anode of the rectifier. As such, additional passive components, such as resistors, may be used on the bias winding to scale the voltage from the bias winding to a value that is more suitable to be received by controller 122.

In the example of FIG. 2, input voltage $V_{IN}$ 102 is positive with respect to an input return 111, and output voltage $V_O$ 120 is positive with respect to an output return 117. The example of FIG. 2 shows galvanic isolation between the input return 111 and the output return 117 because input return 111 and output return 117 are designated by different symbols. In other words, a dc voltage applied between input return 111 and output return 117 will produce substantially zero current. Therefore, circuits electrically coupled to the primary winding 106 are galvanically isolated from circuits electrically coupled to the secondary winding 108.

Use of bias winding 206 to sense output voltage $V_O$ has the advantages of providing galvanic isolation between the output voltage $V_O$ and the controller 122 without the expense of an optocoupler. However, when using a winding on coupled inductor 204 to sense output voltage $V_O$, the voltage $V_B$ at bias winding 206 is representative of output voltage $V_O$ only when output rectifier D1 114 is conducting. In other words, the sense circuit 120 may only sense the output voltage $V_O$ during the off-time of the switch S1 110.

The switching current of various modes of operation is illustrated in FIG. 3A. A diagram of an example switching current waveform of the switched mode power converter of FIG. 1 and FIG. 2 is illustrated including switching period $T_S$ 304, a switch on-time $t_{ON}$ 306, a switch off-time $t_{OFF}$ 308, trapezoidal shape 310, and triangular shape 312. FIG. 3A illustrates the general waveforms of the switch current $I_D$ 302 with respect to time when the controller is operating in both continuous conduction mode (CCM) and discontinuous conduction mode (DCM). In one example, the general waveforms of switch current $I_D$ 302 represent the switch current $I_D$ 130 illustrated in FIGS. 1 and 2.

During any switching period $T_S$ 304, switch S1 110 may conduct in response to the drive signal 128 from the controller 122 to regulate the output quantity $U_O$. The switching period $T_S$ 304 may be separated into two sections of time: switch on-time $t_{ON}$ 306 and switch off-time $t_{OFF}$ 308. Switch on-time $t_{ON}$ 306 denotes the portion of the switching period $T_S$ 304 where the switch S1 110 may conduct. Switch off-time $t_{OFF}$ 308 denotes the remaining portion of the switching period $T_S$ 304 when the switch S1 110 cannot conduct. The current waveform of FIG. 3A illustrates two fundamental modes of operation. The trapezoidal shape 310 is characteristic of continuous conduction mode (CCM) whereas the triangular shape 312 is characteristic of discontinuous conduction mode (DCM). During CCM, the switch current $I_D$ 302 is substantially non-zero immediately after the start of the switch on-time $t_{ON}$ 306. At DCM, the switch current $I_D$ 302 is substantially zero immediately after the beginning of the switch on-time $t_{ON}$ 306. During the switch off-time $t_{OFF}$ 308, the switch current $I_D$ 302 is substantially zero for both CCM and DCM.

Referring next to FIG. 3B, another diagram of an example of a switching current waveform is illustrated including switch current $I_D$ 314, switching period $T_S$ 302, switch on-time $t_{ON}$ 306, switch off-time $t_{OFF}$ 308, and a current limit $I_{LIM}$ 316. In one example, FIG. 3B demonstrates the general switch current $I_D$ 130 of FIGS. 1 and 2 with respect to time when PWM mode control of the switch S1 110 is utilized to regulate the output quantity $U_O$. In particular, FIG. 3B demonstrates the general switch current $I_D$ 130 with respect to time when PWM peak current control is utilized.

The switch S1 110 conducts at the beginning of each switching period $T_S$ 304. Switch S1 110 conducts until the switch current $I_D$ 314 reaches the current limit $I_{LIM}$ 316. In one example, control of the current limit $I_{LIM}$ 316 maintains the peak of the switch current $I_D$ 314 at a value required to regulate the output quantity $U_O$. In some embodiments, the length of switching period $T_S$ 302 remains constant. In other embodiments, the length of switching period $T_S$ 302 may vary. In general, a higher maximum current limit $I_{LIM}$ 316 results in a longer switch on-time $t_{ON}$ 306. The regulation is accomplished by a fixed frequency PWM technique known as fixed frequency PWM current mode control, fixed frequency PWM current programmed control, and/or PWM peak current mode control.

The term "fixed frequency control" does not necessarily entail that the switching frequency $f_S$ of the switch S1 110 remains unchanged. The use of the term "fixed frequency" control indicates that the switching frequency $f_S$ of the switch is not used as a control variable to regulate the output quantity $U_O$. For the example of fixed frequency current mode control, the value of the current limit $I_{LIM}$ 316 is utilized as the control variable to regulate the output quantity $U_O$.

Figure 4:
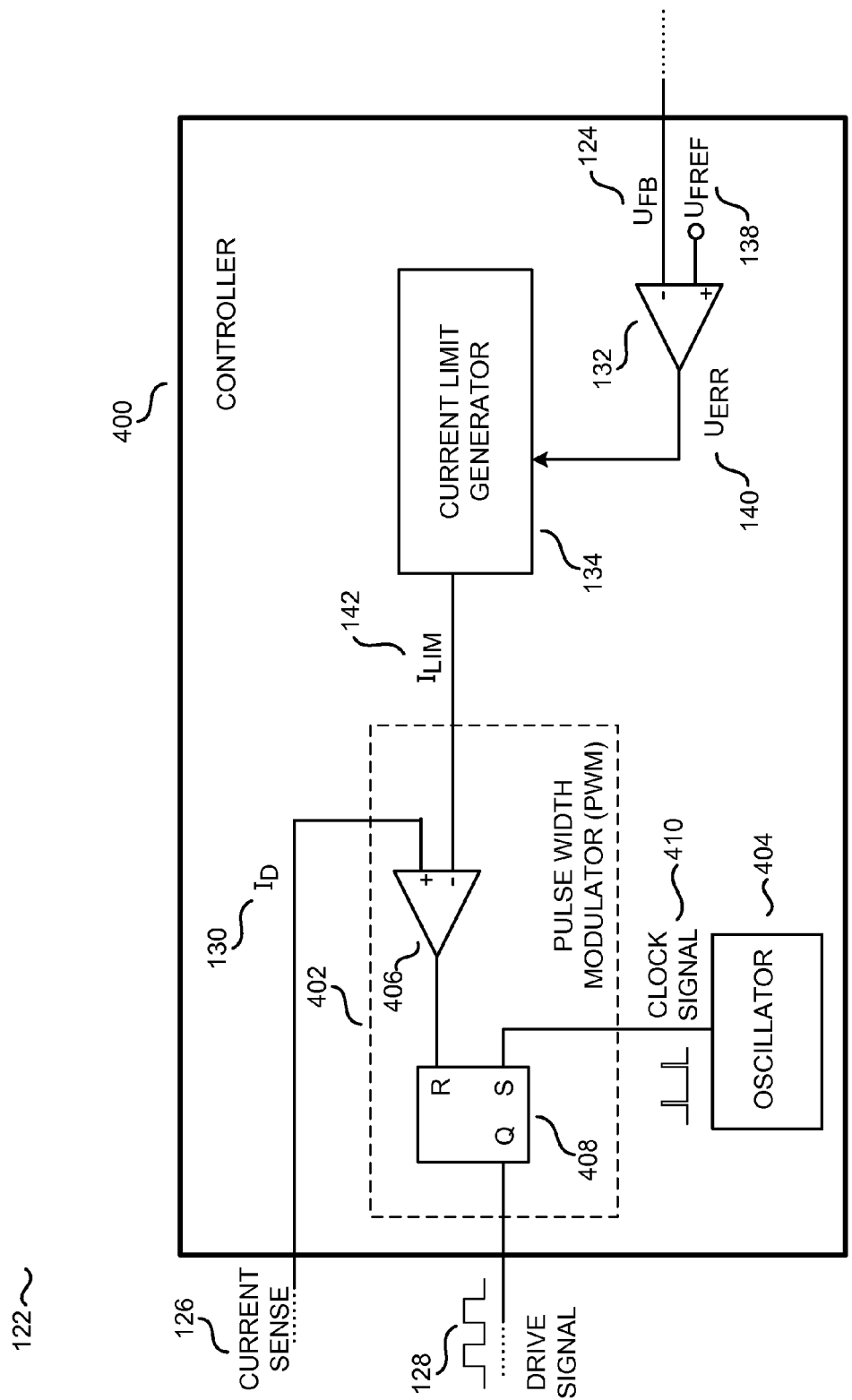
FIG. 4 is a schematic illustrating an example controller in accordance with an embodiment of the present invention.

Referring next to FIG. 4, a block diagram of an example of controller 400 is illustrated including feedback reference circuit 132, current limit generator 134, a PWM block 402, and an oscillator 404. The PWM block 402 includes a comparator 406 and a latch 408. Further illustrated in FIG. 4 are feedback signal $U_{FB}$ 124, current sense signal 126, drive signal 128, feedback reference signal $U_{FREF}$ 138, error signal $U_{ERR}$ 140, current limit $I_{LIM}$ 142, and a clock signal 410. Controller 400 is one example of controller 122 illustrated in FIGS. 1 and 2.

The controller 400 further illustrates a controller utilizing PWM peak current mode control. As illustrated, the PWM block 402 is coupled to receive the current sense signal 126 and output the drive signal 128 to switch S1 110. As mentioned above, the current sense signal 126 is representative of switch current $I_D$ 130. The PWM block 402 is further coupled to the current limit generator 134 and receives the current limit ILIM 142. Further, the PWM block 402 is coupled to oscillator 404 and receives the clock signal 410.

The PWM block 402 further includes comparator 406 and latch 408. In the example shown, latch 408 is an S-R latch. Comparator 406 receives the current sense signal 126 (and hence the switch current $I_D$ 130) at the non-inverting input and the current limit $I_{LIM}$ 142 at the inverting input. The output of comparator 406 is then coupled to the reset-input of latch 408. At the set-input of latch 408, the latch 408 receives the clock signal 410 from oscillator 404. Utilizing the signals received at the reset-input and set-input, the latch 408 outputs drive signal 128.

In operation, when the clock signal 410 pulses to a logic high value signaling the beginning of a switching period $T_S$, the output of the latch 408 transitions from a logic low value to a logic high value and the drive signal 128 turns the switch S1 110 on. Clock signal 410 quickly falls to a logic low value and the output of the latch 408 remains at the logic high value. The drive signal 128 (in other words, the output of the latch 408) may transition to a logic low value when the value of the current sense signal 126 (i.e. the switch current $I_D$ 130) reaches the value of the current limit provided by the current limit signal $I_{LIM}$ 142. When the switch current $I_D$ 130 reaches the current limit $I_{LIM}$ 142, the output of comparator 406 transitions to a logic high value. When the latch 408 receives a logic high value at the reset-input, the output of the latch 408 transitions to a logic low value and the switch S1 110 is turned off. Since the current limit $I_{LIM}$ 142 is partially utilized to control switch S1 110, it is important to provide an accurate current limit to regulate output of the power converter.

Figure 5:
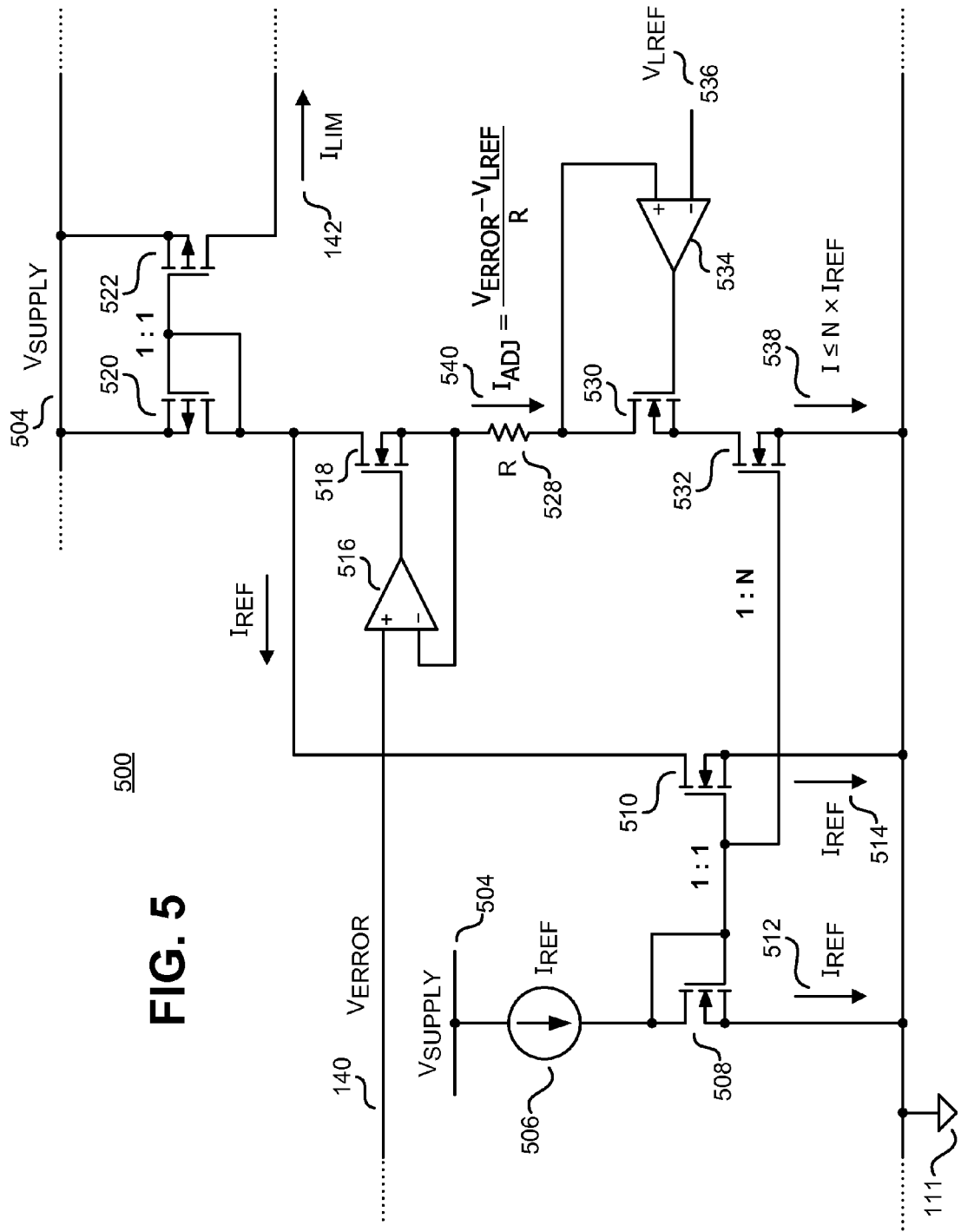
FIG. 5 is a circuit diagram of an example current limit generator in accordance with an embodiment of the present invention.

FIG. 5 illustrates a circuit diagram of an example current limit generator 500. Current limit generator 500 is configured to generate an adjustable temperature independent current limit having a value that changes based on the voltage of an error signal that is representative of a difference between an actual output and a desired output of a power converter. Current limit generator 500 may be included within a controller similar or identical to controller 122 and/or controller 400.

Current limit generator 500 includes supply voltage $V_{SUPPLY}$ 504, temperature independent current source 506, operational amplifiers 516 and 534, transistors 508, 510, 518, 520, 522, 530, and 532, and resistor 528. Operational amplifiers 516 and 534 with respective transistors 518 and 530 are configured as voltage followers, such that the voltage at the inverting input of each amplifier is substantially equal to the voltage at the non-inverting input. In the illustrated example, current limit generator 500 includes a reference current circuit including temperature independent current source 506 and transistors 508 and 510 for generating a constant reference current 514. In some examples, temperature independent current source 506 generates a constant temperature independent current 512 having a constant reference current $I_{REF}$ that may be conducted through diode connected transistor 508. The gate of transistor 510 is coupled to the gate of transistor 508, thereby coupling transistor 510 to transistor 508 as a current mirror. In the example shown, the ratio of channel width to channel length of transistor 510 may be the same, or at least substantially the same, as the ratio of channel width to channel length of transistor 508. However, the ratios may be any value. Thus, transistor 510 may conduct a constant reference current 514 equal, or at least substantially equal, to the constant current 512 generated by current source 506.

Current limit generator 500 further includes a comparison circuit including transistors 518, 530, and 532, operational amplifiers 516 and 534, and resistor 528. In some examples, the comparison circuit generates an adjustable reference current 540 based on a comparison between the error voltage $V_{ERROR}$ 140 (one example of error signal $U_{ERR}$ 140) and the reference signal $V_{LREF}$ 536. In particular, the comparison circuit generates an adjustable reference current 540 based on the difference between the error voltage $V_{ERROR}$ 140 and the reference signal $V_{LREF}$ 536. In the illustrated example, the gate of transistor 532 is coupled to the gate of transistor 508, coupling transistor 532 and transistor 508 as a current mirror. However, unlike transistor 510, the ratio of channel width to channel length of transistor 532 may be "N" times that of transistor 508. Thus, transistor 532 may conduct a current 538 equal to $(N \times I_{REF})$.

Transistor 532 is also coupled to resistor 528, transistor 530, and transistor 518 such that a current in transistor 532 is the same as the current in transistor 530, resistor 528, and the transistor 518. The gates of transistors 530 and 518 are coupled to the outputs of operational amplifiers 534 and 516, respectively. Operational amplifier 516 receives error voltage $V_{ERROR}$ 140, which may be a voltage representation of error signal $U_{ERROR}$ 140, at its non-inverting input terminal and is coupled to a first end of resistor 528 at its inverting input terminal. Operational amplifier 534 receives reference voltage $V_{LREF}$ 536, which represents a lower threshold for error voltage $V_{ERROR}$ 140, at its inverting input terminal and is coupled to a second end of resistor 528 at its non-inverting input terminal. When coupled in this way as voltage followers, operational amplifiers 516 and 534 force a current 540 having a value $I_{ADJ}$ equal to $(V_{ERROR} - V_{LREF})/(R)$ in transistor 532 when $V_{ERROR}$ 140 is greater than $V_{LREF}$ 536 and less than $V_{LREF} + (N \times I_{REF} \times R)$. However, since the ratio of channel width to channel length of transistor 532 is "N" times that of transistor 508, the maximum value $I_{ADJ}$ of current 540 is equal to $(N \times I_{REF})$. Therefore, when $V_{ERROR}$ 140 is greater than $V_{LREF} + (N \times I_{REF} \times R)$, operational amplifier 534 and transistor 530 are unable to hold the voltage at the non-inverting input of operational amplifier 534 at the value $V_{LREF}$ 536. As a result, the current $I_{ADJ}$ 540 in resistor 528 remains constant for values of $V_{ERROR}$ 140 greater than $V_{LREF} + (N \times I_{REF} \times R)$. Additionally, when $V_{ERROR}$ 140 is less than reference voltage $V_{LREF}$ 536, operational amplifier 516 and transistor 518 are unable to conduct current into resistor 528, so transistor 532 conducts substantially no current.

In some examples, N may be equal to 3 or more. However, it should be appreciated that other values may be used depending on the reference current $I_{REF}$ and the desired maximum value of temperature independent current limit 142. Additionally, the resistance R of resistor 528 may be selected based on the available voltage (e.g., $V_{SUPPLY}$ 504) and the amount of temperature independent current limit 142 that is desired. In some examples, resistor 528 can include any type of resistor that has a monotonic variation with current and temperature. In other words, the value of the resistor always changes in the same direction with increasing current and increasing temperature. In other examples, resistor 528 may include a temperature independent resistor. In further examples, resistor 528 need not be monotonic.

Current limit generator 500 further includes an output circuit including transistors 520 and 522. In some examples, the output circuit may output temperature independent current limit 142 based at least in part on the constant reference current 514 generated by the reference current circuit and the adjustable reference current 540 generated by the comparison circuit. In the illustrated example, diode connected transistor 520 is coupled to supply voltage $V_{SUPPLY}$ 504, transistor 510, transistor 518, and transistor 522. In this way, the current in transistor 520 is equal to the current in transistor 510 (current 514) plus the current in transistor 518, transistor 530, resistor 528, and transistor 532 (current 540). As mentioned above, the current 514 in transistor 510 has a value equal to the constant reference current $I_{REF}$, while the current 540 in transistor 518, transistor 530, resistor 528, and transistor 532 may have an adjustable value $I_{ADJ}$ between zero and $(N \times I_{REF})$. Thus, the current in transistor 520 has a range between $I_{REF}$ and $(I_{REF} + (N \times I_{REF}))$ amperes (A).

In the output circuit, the gate of transistor 522 is coupled to the gate of transistor 520, thereby coupling transistor 522 to transistor 520 as a current mirror. The channel dimensions of transistor 522 may be the same, or at least substantially the same, as the channel dimensions of transistor 520. Thus, transistor 522 may output a temperature independent current limit 142 having a value $I_{LIM}$ that is equal, or at least substantially equal (e.g., within 5% or less), to the current in transistor 520.

In this configuration, current limit generator 500 may generate a current limit 142 that is independent of temperature. A control loop formed by controller 122, the output of the power converter, and sense circuit 120 may compensate for changes in the resistance of resistor 528 due to changes in temperature. Specifically, referring simultaneously to FIGS. 1, 2, 4, and 5, if the resistance R of resistor 528 increases (e.g., due to a change in temperature), then the current limit 142 will momentarily decrease (due to the adjustable current 540 $((V_{ERROR} - V_{LREF})/(R))$ decreasing), thereby reducing the on-time of switch 110 and providing less power to the output. This may result in a lower output voltage $V_O$, thereby increasing the difference between the output voltage (represented by $U_{FB}$ 124 shown in FIGS. 1, 2, and 4) and the feedback reference voltage $V_{FREF}$ 138. As a result, the error voltage 140 increases. Since the current limit is proportional to $V_{ERROR}/R$, the error voltage $V_{ERROR}$ 140 increases and compensates for the increase in the resistance R to return the current limit 142 to its value before the change in temperature caused the change in the resistance R.

Conversely, if the resistance R of resistor 528 decreases (e.g., due to a change in temperature), then the current limit 142 will momentarily increase (due to the adjustable current 240 $((V_{ERROR} - V_{LREF})/(R))$ increasing), thereby increasing the on-time of switch 110 and providing more power to the output. This may result in a higher output voltage $V_O$, thereby decreasing the difference between the output voltage (represented by $U_{FB}$ 124 shown in FIGS. 1, 2, and 4) and the feedback reference voltage $V_{FREF}$ 138. As a result, the error voltage 140 decreases. Since the current limit is proportional to $V_{ERROR}/R$, the error voltage $V_{ERROR}$ 140 decreases and compensates for the decrease in the resistance R to return the current limit 142 to its value before the change in temperature caused the change in the resistance R.

While the feedback loop may adjust the error voltage VERROR 140 to compensate for changes in resistance R, the change may not adversely affect the controller partially because the gain of the error amplifier 132 is high (e.g., 3000 or more). In some embodiments, the change in the feedback voltage VFB with respect to the feedback reference signal UFREF 138 may be small. Specifically, a small change in the feedback voltage VFB with respect to the feedback reference signal UFREF 138 may result in a relatively large change in the error voltage VERROR 140 due in part to the gain of the error amplifier 132.

By generating a current limit 142 in this way, resistor 528 need not be a temperature independent resistor (otherwise known as a zero TC resistor). As such, components within the current limit generator 500 are temperature dependent. Additionally, as will be discussed in greater detail below with respect to FIG. 6, the minimum ($I_{REF}$) and maximum ($I_{REF}$+ ($N \times I_{REF}$)) values of current limit 142 is determined by the value of temperature independent current source 506 and the ratio of channel width to channel length of transistors 508 and 538. This obviates the need to use a voltage clamp on the error voltage $V_{ERROR}$ 140 to clamp the current limit 142. As a result, the control loop is allowed to change the voltage of error signal $U_{ERROR}$ 140 to compensate for changes in R for the entire range of values for the current limit 142. If the error voltage $V_{ERROR}$ 140 were clamped, the control loop would not be able to compensate for the change in resistance because the control loop relies on the ability to change the voltage of error signal $U_{ERROR}$ 140 to compensate for the change in resistance R. Moreover, the voltage to which the error voltage $V_{ERROR}$ 140 would be clamped would also have to change with temperature in the same way as the resistance R.

Figure 6:
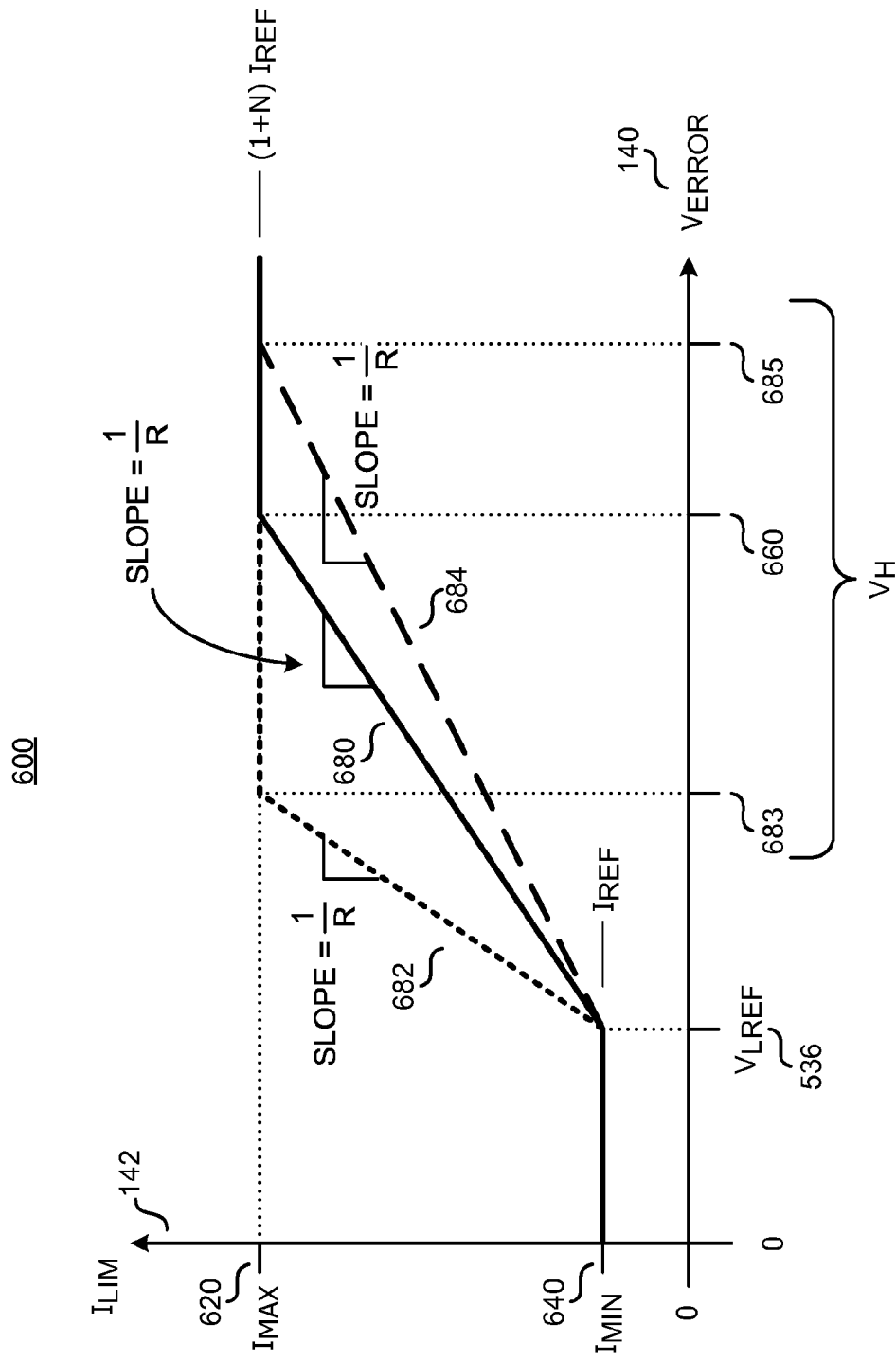
FIG. 6 illustrates the relationship between an error voltage and a current limit in the example current limit generator of FIG. 5 in accordance with an embodiment of the present invention.

FIG. 6 illustrates an example graph illustrating the relationship between an error voltage $V_{ERROR}$ 140 and a temperature independent current limit $I_{LIM}$ 142 over varying temperatures. As shown in FIG. 6, the temperature independent current limit $I_{LIM}$ 142 is equal to minimum current limit $I_{MIN}$ 640 when the error voltage $V_{ERROR}$ 140 is equal to or less than $V_{LREF}$ 536. Referring back to FIG. 5, when the error voltage $V_{ERROR}$ 140 is equal to or less than reference voltage $V_{LREF}$ 536, transistors 518 and 530 are off and the value $I_{ADJ}$ of current 540 is equal, or at least substantially equal, to zero. As a result, the current in transistor 520, and thus, the temperature independent current limit 142 conducted by transistor 522, is equal to $I_{REF}$ (the constant reference current 514 conducted by transistor 510) when the error voltage $V_{ERROR}$ 140 is equal to or less than reference voltage $V_{LREF}$ 536.

When the error voltage $V_{ERROR}$ 140 is between reference voltage $V_{LREF}$ 536 and upper threshold voltage $V_H$ 660, 683, and 685, the temperature independent current limit $I_{LIM}$ 142 changes proportionally (with a slope 680, 682, and 684 of 1/R) with error voltage $V_{ERROR}$ 140. FIG. 6 illustrates the relationship of the error voltage $V_{ERROR}$ 140 and a current limit $I_{LIM}$ 142 over varying temperatures. As the temperature increases, the value of R increases and the slope of the current limit 142 decreases. To illustrate, slope 682 is greater than slope 680, which in turn is greater than slope 684. Slopes 682, 680, and 684 correspond to increasing temperatures and a resultant increase in the value of the resistance R. In addition, the corresponding upper threshold voltage $V_H$ (683, 660, and 685 respectively) also increases with temperature.

Referring back to FIG. 5, as the error voltage $V_{ERROR}$ 140 increases above reference voltage $V_{LREF}$ 536, transistor 518, transistor 530, resistor 528, and transistor 532 conduct the current 540 having value $I_{ADJ}$. The current 540 having value $I_{ADJ}$ linearly increases since resistor 528 is a constant value for a given temperature. As a result, the current in transistor 520, and thus, the temperature independent current limit $I_{LIM}$ 142 in transistor 522, is equal to $I_{REF}$ (the constant reference current 514 in transistor 510) plus the linearly increasing current 540 having value $I_{ADJ}$ when the error voltage $V_{ERROR}$ 140 is between reference voltage $V_{LREF}$ 536 and upper threshold voltage $V_H$.

As shown in FIG. 6, the temperature independent current limit $I_{LIM}$ 142 is equal to the maximum current limit $I_{MAX}$ 620 ((1+N)×$I_{REF}$) when the error voltage $V_{ERROR}$ 140 is equal to or greater than upper threshold $V_H$. Upper threshold $V_H$ corresponds to the value of the error voltage $V_{ERROR}$ 140 that causes the current 540 having value $I_{ADJ}$ to be clamped to N times $I_{REF}$. Referring back to FIG. 5 and as discussed above, the temperature independent current limit 142 linearly increases as the error voltage $V_{ERROR}$ 140 increases above reference voltage $V_{LREF}$ 536. However, as the error voltage $V_{ERROR}$ 140 increases to upper threshold voltage $V_H$, the current 540 reaches its maximum value of (N×$I_{REF}$) and remains constant, or at least substantially constant, for values of error voltage $V_{ERROR}$ 140 greater than $V_H$. For values of error voltage $V_{ERROR}$ 140 greater than $V_H$, operational amplifier 534 and transistor 530 cannot control the voltage at the non-inverting input of operational amplifier 534, and the current in resistor 528 is determined only by the mirrored reference current in transistor 532. As a result, the current in transistor 520, and thus, the temperature independent current limit 142 in transistor 522, is equal to reference current $I_{REF}$ (the constant reference current 514 in transistor 510) plus the maximum value (N×$I_{REF}$) of current 540 when the error voltage $V_{ERROR}$ 140 is greater than upper threshold voltage $V_H$.

It should be appreciated that the value of upper threshold voltage $V_H$ may change with the resistance R and as such, may also change with temperature. In one example, the upper threshold voltage $V_H$ is substantially equal to the reference voltage $V_{LREF}$ 536 added to the product of N, current reference $I_{REF}$, and resistance R; or mathematically: $V_H = V_{LREF} + (NI_{REF}R)$. For example, as the value of R increases (with increasing temperature), the error voltage $V_{ERROR}$ 140 required to produce the same current also increases. Conversely, as the value of R decreases (with decreasing temperature), the error voltage $V_{ERROR}$ 140 required to produce the same current also decreases. However, the value of the minimum and maximum current limits $I_{MIN}$ and $I_{MAX}$ are independent of the value of resistance R.

Figure 7:
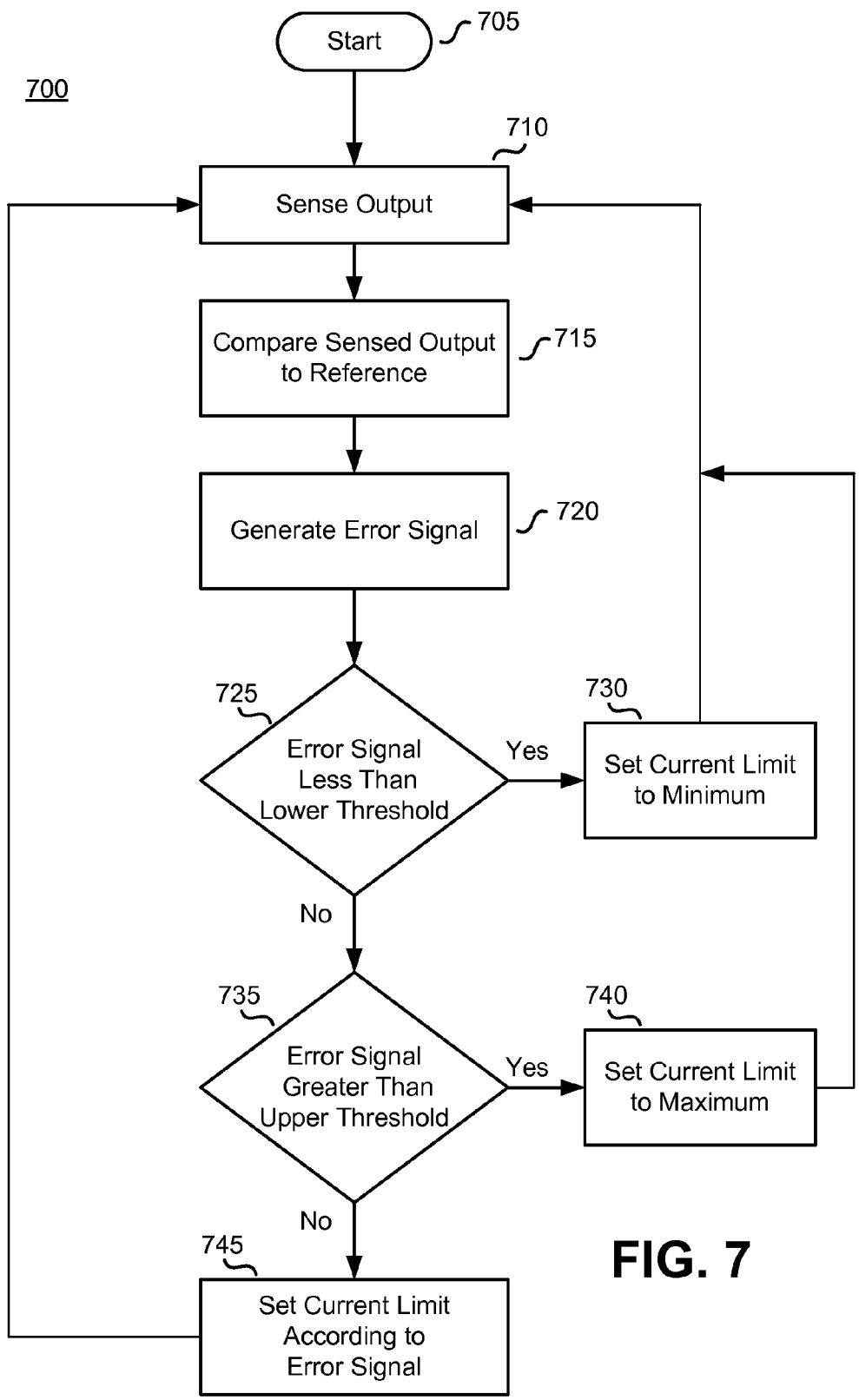
FIG. 7 illustrates an example process for generating a temperature independent current limit in accordance with an embodiment of the present invention.

Referring now to FIG. 7, an example process 700 for generating a temperature independent current limit is shown. Process 700, begins at block 705 and proceeds to block 710, where an output of a power converter is sensed. For example, a signal representative of the output voltage of a power converter may be sensed using a bias winding similar or identical to bias winding 206. In other examples, other techniques for sensing an output may be used.

At block 715, the sensed output may be compared to a reference. For example, an amplifier similar or identical to amplifier 132 may be used to compare the sensed output (e.g., feedback signal $U_{FB}$ 124), which is representative of the output of the power converter, to a reference (e.g., feedback reference signal $U_{FREF}$ 138), which is representative of a desired output of the power converter.

At block 720, an error signal may be generated. For example, an amplifier similar or identical to amplifier 132 may be used to generate an error signal (e.g., error signal $U_{ERR}$ 140) representative of a difference between a desired output value (e.g., reference signal $U_{FREF}$ 138) and an actual output value (e.g., feedback signal $U_{FB}$ 124).

At block 725, it may be determined whether or not the error signal is less than a lower threshold value. For example, a circuit similar or identical to current limit generator 500 may be used to compare the error signal (e.g., error signal $U_{ERR}$ 140) to a lower threshold value, such as $V_{LREF}$. If the error signal is less than the lower threshold, the process may proceed to block 730 where the temperature independent current limit may be set to a minimum value, after which, the process may return to block 710. For example, the temperature independent current limit $I_{LIM}$ may be set to $I_{REF}$ if the error signal is less than the lower threshold. However, if the error signal is not less than the lower threshold, then the process may proceed to block 735

At block 735, it may be determined whether or not the error signal is greater than an upper threshold value. For example, a circuit similar or identical to current limit generator 500 may be used to determine if the error signal (e.g., error signal $U_{ERR}$ 140) is greater than an upper threshold value, such as $V_H$ 660, 683, and 685. If the error signal is greater than the upper threshold, the process may proceed to block 740 where the temperature independent current limit $I_{LIM}$ may be set to a maximum value, after which, the process may return to block 710. For example, the temperature independent current limit $I_{LIM}$ may be set to $I_{REF}+(N\times I_{REF})$ if the error signal is greater than the upper threshold $V_H$. However, if the error signal is not greater than the upper threshold, then the process may proceed to block 745.

At block 745, the temperature independent current limit may be set to a value according to the error signal. For example, using a circuit similar or identical to current limit generator 500, the temperature independent current limit may be set to change proportionally with the error signal (e.g., error signal 140) as shown in FIG. 6. The process may then return to block 710.

While the blocks of process 700 have been presented in a particular sequence, it should be appreciated that they may be performed in any order and that one or more blocks may be performed at the same time.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A controller for use in a power converter, the controller comprising: a feedback reference circuit coupled to receive a feedback signal and coupled to generate an error signal representative of a difference between an actual output value and a desired output value; a current limit generator coupled to generate a temperature independent current limit to regulate an output of the power converter, the current limit generator including: a reference current circuit coupled to generate a constant reference current, wherein the reference current circuit includes: a current source coupled to generate a constant current; and a first current mirror coupled to the current source, wherein the first current mirror includes a first transistor coupled to receive the constant current from the current source, and a second transistor coupled to the first transistor to generate the constant reference current; a comparison circuit coupled to the reference current circuit to generate an adjustable reference current, wherein the comparison circuit includes: a second current mirror including a third transistor coupled to the first and second transistors; a fourth transistor coupled to the third transistor; a resistor coupled to the fourth transistor; a fifth transistor coupled to the resistor, wherein the adjustable reference current is conducted through the fifth transistor, the resistor, the fourth transistor, and the third transistor; a first operational amplifier having an output coupled to the fourth transistor, an inverting input coupled to receive a reference signal, and a non-inverting input coupled to a first end of the resistor; and a second operational amplifier having an output coupled to the fifth transistor, an inverting input coupled to a second end of the resistor, and a non-inverting element coupled to receive the error signal, wherein the reference signal is representative of a value of the error signal corresponding to a minimum current limit, wherein a value of the adjustable reference current is variable based at least in part on a difference between the error signal and the reference signal; and an output circuit coupled to the reference current circuit and the comparison circuit to generate the temperature independent current limit, wherein the output circuit includes a third current mirror circuit including a sixth transistor coupled to a seventh transistor, wherein the reference current circuit and the comparison circuit are coupled to receive the constant reference current and the adjustable reference current from the sixth transistor, and wherein the seventh transistor is coupled to the sixth transistor to mirror a sum of the constant reference current and the adjustable reference current to generate the temperature independent current limit; and drive logic coupled to the current limit generator to receive temperature independent current limit, wherein the drive logic is coupled to generate a drive signal to control switching of a switch of the power converter in response to the temperature independent current limit and a current sense input signal representative of a sensed switch current.

2. The controller of claim 1, wherein a value of the temperature independent current limit is equal to a first non-zero value when a voltage of the error signal is less than or equal to a voltage of the reference signal, wherein the value of the temperature independent current limit is equal to a second value when the voltage of the error signal is greater than or equal to an upper threshold voltage, the second value being greater than the first non-zero value, wherein the value of the temperature independent current limit varies linearly between the first non-zero value and the second value with respect to the voltage of the error signal when the voltage of the error signal is greater than the voltage of the reference signal and less than the upper threshold voltage, and wherein the first non-zero value is set based at least in part on a value of the constant reference current, and wherein the second value is set based at least in part on the value of the constant reference current and a maximum value of the adjustable reference current.

3. The controller of claim 2, wherein the second value is equal to at least four times the first non-zero value.

4. The controller of claim 2, wherein the first non-zero value and the second value are temperature independent values.

5. The controller of claim 1, wherein the current source coupled to generate the constant current is a temperature trimmed current source.

6. The controller of claim 5, wherein a value of the constant reference current is substantially equal to a value of the constant current.

7. The controller of claim 5, wherein the first operational amplifier is coupled to the fourth transistor as a voltage follower, wherein the first operational amplifier is further coupled to control a voltage at the first end of the resistor, wherein the second operational amplifier is coupled to the fifth transistor as a voltage follower, and wherein the second operational amplifier is arranged to control a voltage at the second end of the resistor.

8. The controller of claim 7, wherein the resistor is a non-temperature-controlled resistor.

9. The controller of claim 7, wherein the value of the adjustable reference current is based at least in part on the voltage at the first end of the resistor, the voltage at the second end of the resistor, and a value of the resistor.

10. The controller of claim 1, wherein the value of the temperature independent current limit changes proportionally with the voltage of the error signal when the voltage of the error signal is greater than the voltage of the reference signal and less than an upper threshold voltage.

11. A power converter comprising: an energy transfer element; a switch coupled to the energy transfer element such that a current is conducted through the energy transfer element and the switch during an on time of the switch; and a controller coupled to provide a drive signal to control the switch to regulate an output of the power converter, the drive signal controlled based at least in part by a temperature independent current limit, wherein the controller comprises: a feedback reference circuit coupled to receive a feedback signal and coupled to generate an error signal representative of a difference between an actual output value and a desired output value; a current limit generator coupled to generate the temperature independent current limit, the current limit generator including: a reference current circuit coupled to generate a constant reference current, wherein the reference current circuit includes: a current source coupled to generate a constant current; and a first current mirror coupled to the current source, wherein the first current mirror includes a first transistor coupled to receive the constant current from the current source, and a second transistor coupled to the first transistor to generate the constant reference current; a comparison circuit coupled to the reference current circuit to generate an adjustable reference current, wherein the comparison circuit includes: a second current mirror including a third transistor coupled to the first and second transistors; a fourth transistor coupled to the third transistor; a resistor coupled to the fourth transistor; a fifth transistor coupled to the resistor, wherein the adjustable reference current is conducted through the fifth transistor, the resistor, the fourth transistor, and the third transistor; a first operational amplifier having an output coupled to the fourth transistor, an inverting input coupled to receive a reference signal, and a non-inverting input coupled to a first end of the resistor; and a second operational amplifier having an output coupled to the fifth transistor, an inverting input coupled to a second end of the resistor, and a non-inverting element coupled to receive the error signal, wherein the reference signal is representative of a value of the error signal corresponding to a minimum current limit, wherein a value of the adjustable reference current is variable based at least in part on a difference between the error signal and the reference signal; and an output circuit coupled to the reference current circuit and the comparison circuit to generate the temperature independent current limit, wherein the output circuit includes a third current mirror circuit including a sixth transistor coupled to a seventh transistor, wherein the reference current circuit and the comparison circuit are coupled to receive the constant reference current and the adjustable reference current from the sixth transistor, and wherein the seventh transistor is coupled to the sixth transistor to mirror a sum of the constant reference current and the adjustable reference current to generate the temperature independent current limit; and drive logic coupled to the current limit generator to receive temperature independent current limit, wherein the drive logic is coupled to generate the drive signal in response to the temperature independent current limit and a current sense input signal representative of the current conducted through the switch during the on time of the switch.

12. The power converter of claim 11, wherein the current source coupled to generate the constant current is a temperature trimmed current source.

13. The power converter of claim 12, wherein the first operational amplifier is coupled to the fourth transistor as a voltage follower, wherein the first operational amplifier is further coupled to control a voltage at the first end of the resistor, wherein the second operational amplifier is coupled to the fifth transistor as a voltage follower, and wherein the second operational amplifier is further coupled to control a voltage at the second end of the resistor.

14. The power converter of claim 13, wherein the resistor is a non-temperature-controlled resistor.

* * * * *